United States Patent Office 3,523,011
Patented Aug. 4, 1970

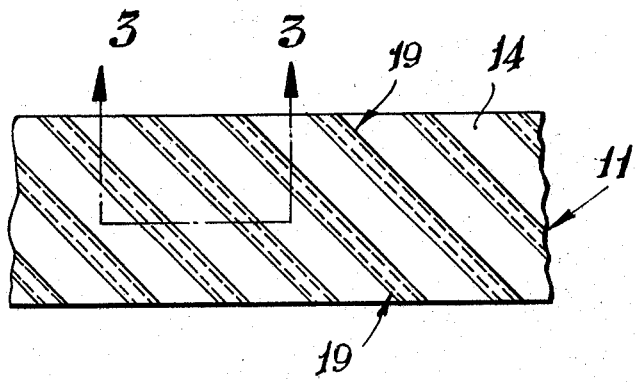
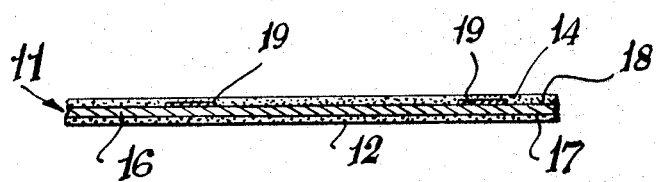
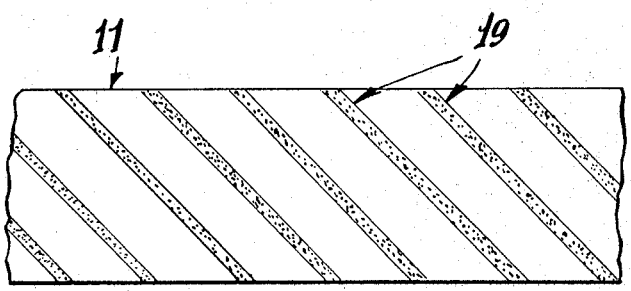

3,523,011
STERILIZATION INDICATOR MATERIAL AND TAPE CONTAINING THE SAME
Nutan C. Bhiwandker, St. Laurent, Quebec, Canada, and Harvey Wacks, Bronx, N.Y., assignors to Canadian Technical Tape Ltd., Montreal, Quebec, Canada, a corporation of Canada
Filed May 7, 1968, Ser. No. 727,285
Int. Cl. C09k *3/00;* G01k *11/12;* G01n *31/22*
U.S. Cl. 23—253                                    8 Claims

ABSTRACT OF THE DISCLOSURE

An indicator material for determining whether steam sterilization has been applied consists of calcium sulfide and lead carbonate. A sterilization indicator tape includes a flexible base having a pair of opposed faces. On one face of the base a pressure-sensitive adhesive is disposed while on the opposite face of the base an indicating material consisting of calcium sulfide and lead carbonate is disposed in spaced diagonal strips. A back size material selected from the class consisting of methacrylate resins and urea-formaldehyde resins overlies the indicating material.

DESCRIPTION OF THE INVENTION

This invention relates to an indicator material for determining whether steam sterilization has been applied and to an indicator tape including the same.

In various sterilization processes it is important to determine whether proper sterilization heat has been applied to various objects which are used in medical and surgical procedures such as bandages, surgical instruments, hypodermic needles, and the like.

In many cases the sterilization processes are not properly performed and instruments and the like which would superficially appear to be sterile actually are not so. Many outbreaks of hepatitis have been traced to the use by physicians of improperly sterilized injection needles.

The conventional method of sterilization is by means of autoclaving with steam which generally produces superheated steam having a temperature of approximately 120° C. This steam, if in proper contact with the material to be sterilized, will effectively destroy practically all types of infectious organisms.

However, in many cases, the autoclaving is not properly done and the steam fails to penetrate to the instrument to be sterilized. As a result materials which superficially would appear to be subjected to autoclaving and superficially are sterile are in fact not sterile.

Various indicating materials have heretofore been employed in an attempt to visually show whether the steam has penetrated the material to be sterilized or not. These indicating materials have been uniformly unsatisfactory because they are either too sensitive and therefore activate at too low a temperature or are too insensitive and activate at too high a temperature.

The indicating material of this invention is specifically designed to activate at the proper temperature and to give a visual indication. Furthermore, when the indicating material of this invention is placed upon a tape it is preferably surrounded by a steam permeable back size material which is also water insoluble. Therefore the tape of this invention is easily handled and resists deterioration but is extremely effective for the purpose employed. The tape also has a pressure-sensitive adhesive on the opposite face which permits it to be applied to the material to be sterilized or to the container therefor so as to give clear visual sterilization indication.

In the preferred modification of this invention the indicating material is disposed upon the tape in spaced diagonal strips so as to give a clear indication of the effectiveness of the sterilization process.

The indicating material employed consists of a mixture of calcium sulfide and lead carbonate.

The above constitutes a brief description of this invention and some of the objects and advantages thereof. Further objects and advantages of this invention will become apparent to the reader of this specification as this description proceeds.

The invention will now be further described by reference to the accompanying drawings which are made a part of this specification.

FIG. 1 is a plan view of a sterilization indicating tape made in accordance with this invention with the sterilization indicating material disposed thereupon in inactivated condition and indicated by phantom lines.

FIG. 2 is a view similar to that of FIG. 1 but showing the condition of the indicator tape of this invention when exposed to proper autoclaving temperatures.

FIG. 3 is a sectional view of the sterilization indicating tape of this invention taken along lines 3—3 of FIG. 2.

The invention will now be further described by reference to the specific forms thereof as shown in the accompanying drawings. In this connection, however, the reader is cautioned to note that the specific form of this invention as set forth in the specification herein is for illustrative purposes and for purposes of example only. Various changes and modifications can obviously be made within the spirit and scope of this invention.

The sterilization indicating tape 11 of this invention is formed with a base 16 which is made of any conventional substrate material such as paper, Mylar, cloth or the like. The base is formed with a pair of opposed faces 17 and 18. Disposed upon face 17 is a pressure-sensitive adhesive 12 of any conventional type but sufficiently heat-stable so as not to become inactive at the normal autoclaving temperatures to which it will be subjected.

Disposed upon the opposite face 18 of base 16 are a plurality of spaced diagonally disposed lines 19 which are "printed" upon face 18. These lines are composed of an indicating material which is composed of calcium sulfide and lead carbonate. In the preferred modification of this invention the indicator material consists of equal parts by weight of calcium sulfide and lead carbonate (the calcium sulfide being 75% pure). In general the operative range of proportions of calcium sulfide and lead carbonate consists of one part of lead carbonate by weight to 0.5 to two (2) parts by weight of calcium sulfide.

Disposed above elements 19 is a back size 14 which is water insoluble but steam permeable. The preferred back size material utilized in connection with this invention is Lucite 45 which is manufactured by the E. I. du Pont de Nemours Company and consists of a homopolymer of iso-butyl methacrylate. Also urea-formaldehyde resins or any other resin which is water insoluble but steam permeable may also be employed.

In operation the tape of this invention is placed in conjunction with material which is to be sterilized by steam autoclaving. Normally calcium sulfide and lead carbonate are white materials and, since the base material is normally white and the back size normally colorless the tape appears to be white. However when steam at a temperature of approximately 120° C. is applied to the tape the calcium sulfide decomposes to form calcium hydroxide and hydrogen sulfide. The hydrogen sulfide in turn attacks the lead carbonate to form lead sulfide and carbonic acid. Lead sulfide is, of course, black and therefore the tape will show a series of diagonal spaced black lines. However, if sterilization has not properly been performed or if the steam has not reached all parts of the material to be sterilized, this fact will dramatically be shown on the tape by the indication of white areas between the black lines or the tape will not show the black lines.

The foregoing sets forth the manner in which the objects of this invention are achieved.

We claim:

1. An indicator material for determining whether steam sterilization has been applied consisting of calcium sulfide and lead carbonate.

2. An indicator material as described in claim 1 said composition proportions by weight being one part of lead carbonate to 0.5 to two (2) parts of calcium sulfide.

3. An indicator material as described in claim 1 said composition proportions by weight being equal amounts by weight of calcium sulfide and lead carbonate.

4. An indicator tape to determine whether material has been subjected to steam sterilization comprising a flexible base having a pair of opposed faces, a pressure-sensitive adhesive on one face of said base member, a heat activatable indicating material on the opposite side of said base member, said indicating material consisting of a mixture of calcium sulfide and lead carbonate, and a water insoluble steam permeable back size material overlying said indicating material.

5. An indicator tape as described in claim 4 said back size material selected from the class consisting of methacrylate resins and urea-formaldehyde resins.

6. An indicating tape as described in claim 5 the proportions by weight of components of said indicating material being one part of lead carbonate to 0.5 to two (2) parts of calcium sulfide.

7. An indicating tape as described in claim 5 the proportions by weight of components of said indicating material being equal parts of lead carbonate and calcium sulfide.

8. An indicating tape as described in claim 7 said indicating material being disposed in spaced diagonal strips along a face of said tape.

References Cited

UNITED STATES PATENTS 2,889,799 6/1959 Korpman _____ 116—114.20
3,311,084 3/1967 Edenbaum.

MORRIS O. WOLK, Primary Examiner

R. M. REESE, Assistant Examiner

U.S. Cl. X.R.

73—356; 116—114; 252—408